No. 777,040. PATENTED DEC. 6, 1904.
A. L. MALONE.
COUPLING.
APPLICATION FILED DEC. 10, 1902.
NO MODEL.
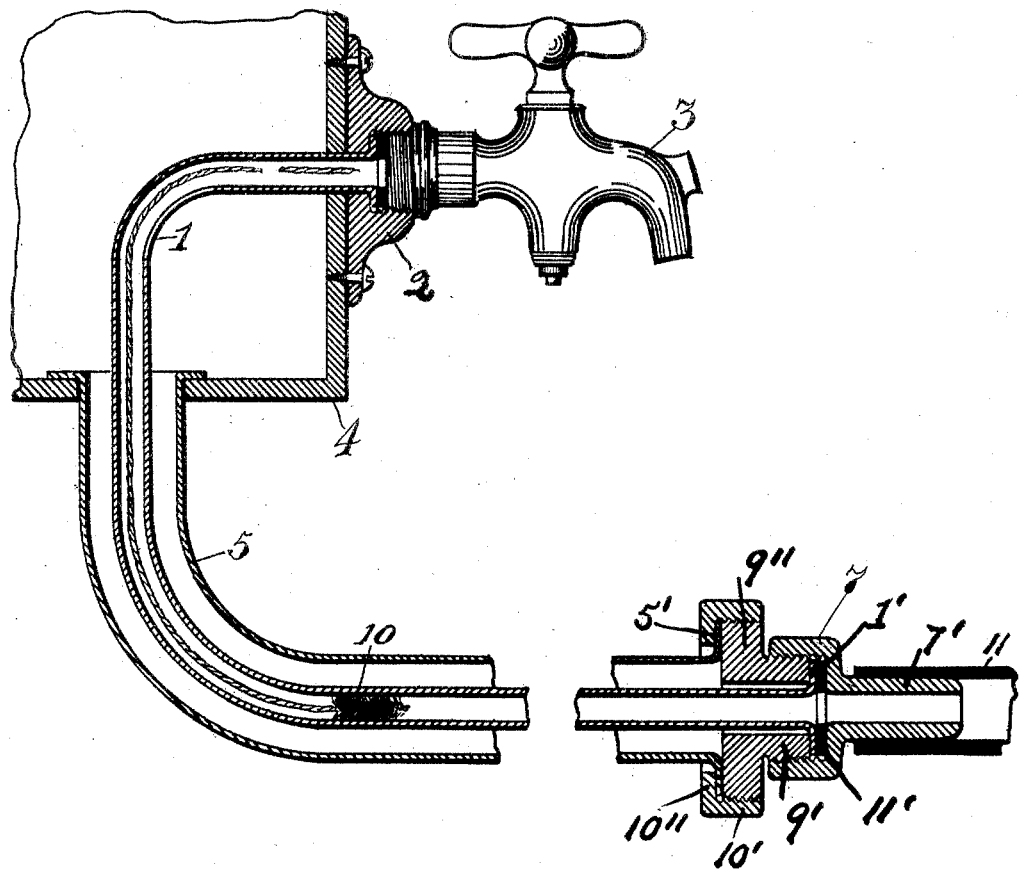
WITNESSES: Albert L. Malone INVENTOR.
BY
Frank P. Medina ATTORNEY.

No. 777,040. Patented December 6, 1904.

UNITED STATES PATENT OFFICE.

ALBERT L. MALONE, OF SAN FRANCISCO, CALIFORNIA.

COUPLING.

SPECIFICATION forming part of Letters Patent No. 777,040, dated December 6, 1904.

Application filed December 10, 1902. Serial No. 134,671. (No model.)

*To all whom it may concern:*

Be it known that I, ALBERT L. MALONE, a citizen of the United States, residing in the city and county of San Francisco, State of California, have invented certain new and useful Improvements in Couplings, designed primarily for use in beer-drawing apparatus, of which the following is a specification.

The novelty resides in the particular construction and the combination and arrangement of parts, all as more fully hereinafter described and claimed.

The drawing represents a substantially central vertical section illustrating the application of the invention.

1 designates a pipe having one end held in the bracket-coupling 2, carrying the faucet 3. 4 is the box, in the bottom of which is held one end of a water-jacket 5, through which the pipe 1 is passed.

7 is a coupling having an extension 7'. This coupling screws onto the extension 9' of a coupling 9'', which receives a nut 10'. The end of the pipe 1 has a flange 1', which engages the outer end of the extension 9' and against a washer 11', while the end of the jacket 5 has a flange 5', which is held between the flange 10'' of the nut 10' and the adjacent end of the coupling 9'', and thus the end of the jacket is closed water-tight and all the parts are securely held together. The extension 7' receives a flexibe pipe 11, designed to connect with a keg or other receptacle.

10 designates a brush for cleaning the pipe 1.

Having described my invention, what I claim as new, and desire to secure by Letters Patent of the United States, is—

In a device of the character described, the combination of two pipes one within the other, the said pipes each having a flange at its outer end, a coupling having an extension engaging the flange of the outer pipe and threaded end engaging the flange of the other pipe, and confining the flange of the outer pipe between the flange of the coupling and the flange of a nut, a flanged nut on said extension, a coupling on the threaded end of the first-mentioned coupling, a washer interposed between the flange of the one pipe and a shoulder on the last-mentioned coupling, the latter having an extension to receive a flexible pipe, all substantially as shown and described.

In testimony whereof I have hereunto signed my name in the presence of two witnesses.

ALBERT L. MALONE.

Witnesses:
F. R. DEREMER,
GUSTAVE J. MCGREGOR.